(12) United States Patent
Ikeda

(10) Patent No.: US 11,622,027 B2
(45) Date of Patent: Apr. 4, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Atsushi Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/517,454

(22) Filed: Nov. 2, 2021

(65) Prior Publication Data
US 2022/0150322 A1    May 12, 2022

(30) Foreign Application Priority Data
Nov. 11, 2020    (JP) .............................. JP2020-187884

(51) Int. Cl.
*H04L 67/5683* (2022.01)
*G06F 9/455* (2018.01)
*G06F 16/957* (2019.01)
*G06F 16/955* (2019.01)

(52) U.S. Cl.
CPC ...... *H04L 67/5683* (2022.05); *G06F 9/45558* (2013.01); *G06F 16/9566* (2019.01); *G06F 16/9574* (2019.01); *G06F 2009/45595* (2013.01)

(58) Field of Classification Search
CPC . H04L 67/50–67/5683; G06F 16/95–16/9574; G06F 9/448–9/45558
See application file for complete search history.

(56) References Cited

U.S. PATENT DOCUMENTS

2018/0159896 A1* 6/2018 Soman ................ H04L 63/1491

FOREIGN PATENT DOCUMENTS

JP    6354195 B2    7/2018

OTHER PUBLICATIONS

Darren Remington, "Cloudflare + Remote Browser Isolation", Jan. 7, 2020, Cloudflare, pp. 1-16 (Year: 2020).*
Tim Obezuk, "Introducing Cloudflare Browser Isolation beta", Oct. 15, 2020, Cloudflare, pp. 1-9 (Year: 2020).*
Simon Moran, "Forcepoint Integrates Ericom Shield Adding Remote Browser Isolation to Its Dynamic Edge Protection Cloud-Native SASE Solution", Aug. 25, 2020, Eircom, pp. 1-5 (Year: 2020).*

* cited by examiner

*Primary Examiner* — Clayton R Williams
(74) *Attorney, Agent, or Firm* — Canon U.S.A., Inc. IP Division

(57) ABSTRACT

A plurality of users is allowed to share cached data. Cached data for web content that one of a plurality of web machines is requested to draw is stored so that the cached data is available by the plurality of web machines, and in a case where a first web machine of the plurality of web machines is requested to draw first web content and cached data for the first web content is stored, a drawing result based on the cached data is transmitted to a communication apparatus by which the request to draw is issued, whereas in a case where the first web machine is requested to draw the first web content and the cached data for the first web content is not stored, the first web content is drawn based on a resource acquired from a web server, and a drawing result is transmitted to the communication apparatus.

10 Claims, 18 Drawing Sheets

FIG.6A  403

| User Name | Storage Name |
|---|---|
| John, Alex, Fred | SG_01 |
| Robin, Chris, Terry | SG_02 |

FIG.6B

| URL | Date/Time | Header Information | Cached Data |
|---|---|---|---|
| http://example.com/a.png | Wed, 1 Apr 2020 00:00:00 GMT | Cache-Control: max-age=86400 | **** |
| http://example.com/b.png | Wed, 1 Apr 2020 00:00:00 GMT | Cache-Control: max-age=172800 | **** |
| http://canon.global/a.png | Wed, 8 Apr 2020 00:00:00 GMT | Expires: Wed, 10 Jun 2020 00:00:00 GMT | **** |

FIG.6C

| URL | Date/Time | Header Information | Cached Data |
|---|---|---|---|
| http://example.com/a.png | Fri, 3 Apr 2020 00:00:00 GMT | Cache-Control: max-age=86400 | **** |
| http://canon.global/b.png | Fri, 10 Apr 2020 00:00:00 GMT | Expires: Fri, 17 Apr 2020 00:00:00 GMT | **** |
| http://canon.global/c.png | Fri, 10 Apr 2020 00:00:00 GMT | Expires: Wed, 10 Jun 2020 00:00:00 GMT | **** |

FIG. 8A

| URL | Date/Time | Header Information | Cached Data |
|---|---|---|---|
| http://example.com/a.png | Wed, 1 Apr 2020 00:00:00 GMT | Cache-Control: max-age=86400 | **** |
| http://example.com/b.png | Wed, 1 Apr 2020 00:00:00 GMT | Cache-Control: max-age=172800 | **** |
| http://canon.global/a.png | Wed, 8 Apr 2020 00:00:00 GMT | Expires: Wed, 10 Jun 2020 00:00:00 GMT | **** |

FIG. 8B

| URL | Date/Time | Header Information | Cached Data |
|---|---|---|---|
| http://example.com/a.png | Wed, 1 Apr 2020 10:00:00 GMT | Cache-Control: max-age=86400 | **** |
| http://example.com/b.png | Wed, 1 Apr 2020 00:00:00 GMT | Cache-Control: max-age=172800 | **** |
| http://canon.global/a.png | Wed, 8 Apr 2020 00:00:00 GMT | Expires: Wed, 10 Jun 2020 00:00:00 GMT | **** |

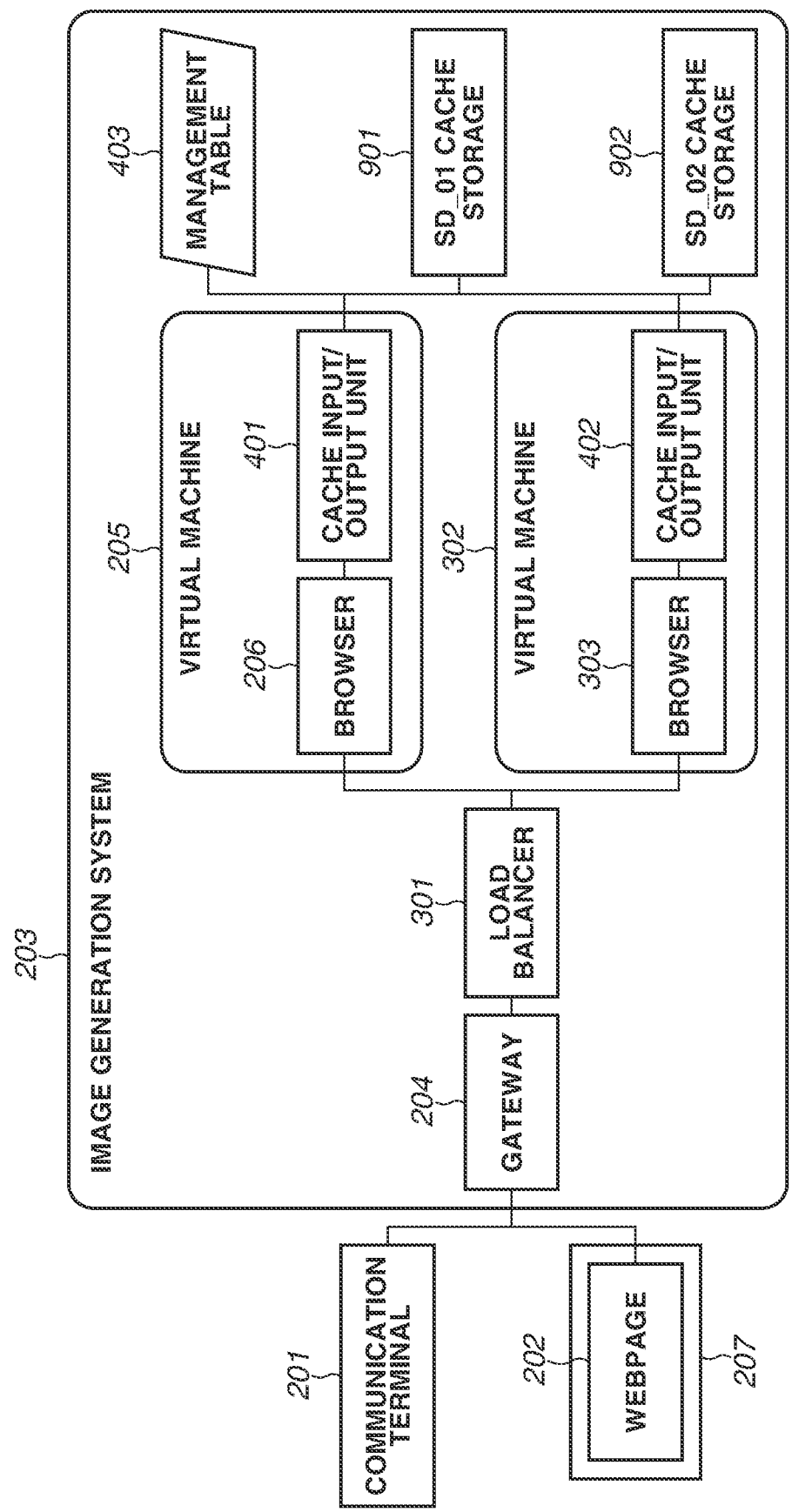

FIG. 11A

| Domain | Storage Name |
|---|---|
| example.com | SD_01 |
| abcde.com | SD_02 |

FIG. 11B

| Path | Date/Time | Header Information | Cached Data |
|---|---|---|---|
| a.png | Wed, 1 Apr 2020 00:00:00 GMT | Cache-Control: max-age=86400 | **** |
| b.png | Wed, 1 Apr 2020 00:00:00 GMT | Cache-Control: max-age=172800 | **** |

FIG. 11C

| Path | Date/Time | Header Information | Cached Data |
|---|---|---|---|
| b.png | Fri, 10 Apr 2020 00:00:00 GMT | Expires: Fri, 17 Apr 2020 00:00:00 GMT | **** |
| c.png | Fri, 10 Apr 2020 00:00:00 GMT | Expires: Wed, 10 Jun 2020 00:00:00 GMT | **** |

FIG. 17A

| URL | Date/Time | Header Information | public | Cached Data |
|---|---|---|---|---|
| http://example.com/a.png | Wed, 1 Apr 2020 10:00:00 GMT | Cache-Control: max-age=86400 | 1 | **** |
| http://canon.global/a.png | Wed, 8 Apr 2020 10:00:00 GMT | Expires: Wed, 10 Jun 2020 00:00:00 GMT | 0 | **** |

FIG. 17B

| URL | Date/Time | Header Information | Cached Data |
|---|---|---|---|
| http://canon.global/b.png | Fri, 10 Apr 2020 00:00:00 GMT | Expires: Fri, 17 Apr 2020 00:00:00 GMT | **** |
| http://canon.global/c.png | Fri, 10 Apr 2020 00:00:00 GMT | Expires: Wed, 10 Jun 2020 00:00:00 GMT | **** |

FIG. 17C

| URL | Date/Time | Header Information | Cached Data |
|---|---|---|---|
| http://canon.global/b.png | Fri, 10 Apr 2020 00:00:00 GMT | Expires: Fri, 17 Apr 2020 00:00:00 GMT | **** |
| http://canon.global/c.png | Fri, 10 Apr 2020 00:00:00 GMT | Expires: Wed, 10 Jun 2020 00:00:00 GMT | **** |
| http://canon.global/a.png | Wed, 8 Apr 2020 10:00:00 GMT | Expires: Wed, 10 Jun 2020 00:00:00 GMT | **** |

FIG. 18A

| URL | Date/Time | Header Information | public | Cached Data |
|---|---|---|---|---|
| http://example.com/a.png | Wed, 1 Apr 2020 10:00:00 GMT | Cache-Control: max-age=86400 | 1 | **** |
| http://canon.global/a.png | Wed, 8 Apr 2020 00:00:00 GMT | Expires: Wed, 10 Jun 2020 00:00:00 GMT | 0 | **** |

FIG. 18B

| URL | Date/Time | Header Information | Cached Data |
|---|---|---|---|
| http://example.com/a.png | Wed, 1 Apr 2020 00:00:00 GMT | Cache-Control: max-age=86400 | **** |
| http://example.com/b.png | Wed, 1 Apr 2020 00:00:00 GMT | Cache-Control: max-age=172800 | **** |

FIG. 18C

| URL | Date/Time | Header Information | Cached Data |
|---|---|---|---|
| http://example.com/a.png | Wed, 1 Apr 2020 10:00:00 GMT | Cache-Control: max-age=86400 | **** |
| http://example.com/b.png | Wed, 1 Apr 2020 00:00:00 GMT | Cache-Control: max-age=172800 | **** |

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

Communication terminals that include a web browser (hereinafter, "browser") and have a function of viewing webpages on the browser are popularly used. A webpage of an external service is displayed through the browser so that the communication terminal can cooperate with the external service.

Meanwhile, a cloud browser is a form of a browser that generates a drawing result of a webpage on a cloud server and transmits the drawing result to a communication terminal to display the drawing result on the communication terminal. Processing with high calculation load such as webpage analysis processing and execution processing is executed on the cloud server so that the calculation load is not placed on the communication terminal.

In the form of a cloud browser, a browser operates on a virtual machine operating on a cloud server. Various device resources necessary for a computer are virtually allocated to the virtual machine. Thus, the browser operating on the virtual machine can operate as in a case where the browser operates on the computer. There is a known method in which a cloud browser displays a drawing result using a plurality of displays in combination as a large display (refer to Japanese Patent No. 6354195).

According to Japanese Patent No. 6354195, a browser that operates on a single virtual machine is used for a plurality of communication terminals. However, in a case where simultaneous use of a cloud browser by a plurality of users is allowed, an issue of increased network access to external sites arises.

For example, in order to allow simultaneous use of a cloud browser by a plurality of users, a plurality of virtual machines is prepared on a cloud server, and the virtual machines to use are allocated by a load balancer. Specifically, a first virtual machine and a second virtual machine are prepared. In this case, the same browser operates on the first virtual machine and the second virtual machine.

Then, the browser accesses a first external site. The browser generates a cache for the first external site, and from next time the browser attempts to access the first external site, the browser acquires data on the first external site from the cache without network communication.

A case where there are two users of the cloud browser, John and Terry, will be discussed below. When John uses the cloud browser for the first time, the load balancer requests the first virtual machine to perform processing. At this time, the browser generates a cache for the first external site on the first virtual machine and stores webpage data in the cache.

Next, when Terry uses the cloud browser, the load balancer requests the second virtual machine to perform processing. At this time, the browser refers to a cache for the first external site on the second virtual machine, but there is no corresponding cache on the second virtual machine, so that network communication occurs. Thus, there are demands for a method by which a plurality of users using a cloud browser can share an existing cache.

SUMMARY

The present disclosure is directed to a technique by which a plurality of users can share cached data and the network load is decreased in a case where the plurality of users uses a cloud browser.

According to an aspect of the present disclosure, an information processing apparatus including a plurality of web machines includes a storage unit configured to store cached data for web content that one of the plurality of web machines is requested to draw so that the cached data is available for use by the plurality of web machines, a first transmission unit configured to transmit, in a case where a first web machine of the plurality of web machines is requested to draw first web content and cached data for the first web content is stored in the storage unit, a drawing result based on the cached data to a communication apparatus by which the request to draw is issued, and a second transmission unit configured to draw the first web content based on a resource acquired from a web server and transmit a drawing result to the communication apparatus in a case where the first web machine is requested to draw the first web content and the cached data for the first web content is not stored in the storage unit.

Further features of the present disclosure will become apparent from the following description of exemplary embodiments with reference to the attached drawings.

BRIEF DESCRIPTION OF THE DRAWINGS

FIGS. 6A to 6C are diagrams illustrating an example of a management table and cached data sets.

FIGS. 8A and 8B are diagrams illustrating a SG_01 cache storage before and after being updated.

FIG. 9 is a diagram illustrating an example of a configuration of an information processing system.

FIGS. 11A to 11C are diagrams illustrating an example of a management table and cached data sets.

FIGS. 17A to 17C are diagrams illustrating a cache storage for John before and after being updated.

FIGS. 18A to 18C are diagrams illustrating a SG_01 cache storage before and after being updated.

DESCRIPTION OF THE EMBODIMENTS

Figure 1:
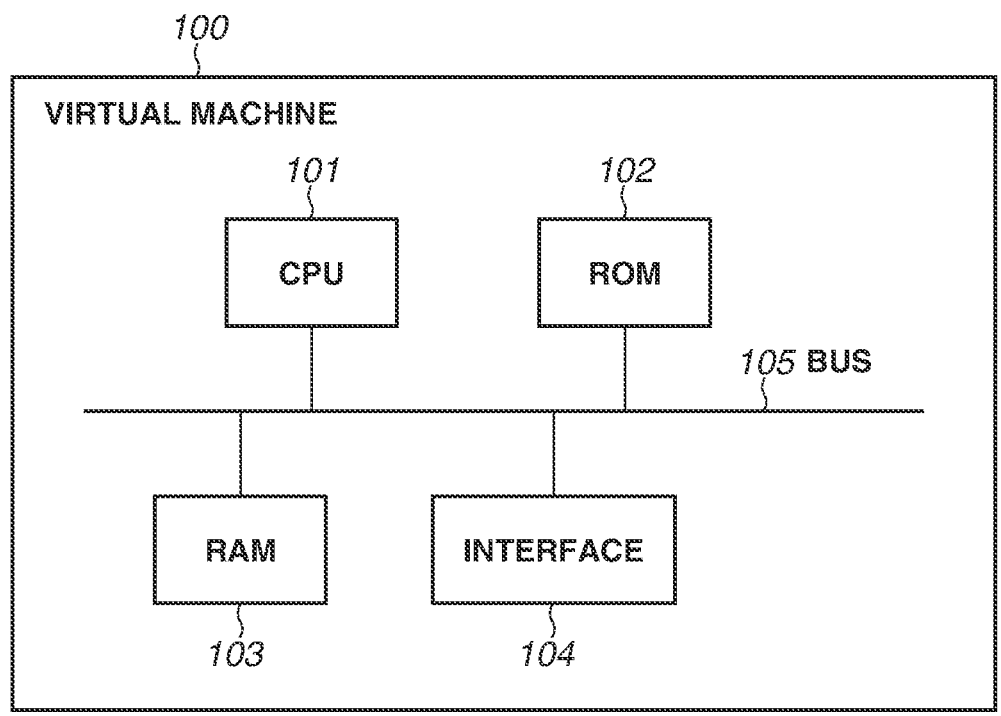
FIG. 1 is a diagram illustrating an example of a hardware configuration of a virtual machine.

Various exemplary embodiments of the present disclosure will be described below with reference to the drawings. It should be noted that the following exemplary embodiments are not intended to limit the scope of the claimed disclosure and that not all combinations of features described in the exemplary embodiments are always essential to a technical solution of the disclosure. Similar components are given the same reference numeral for description.

According to a first exemplary embodiment, a storage is changed based on whether cached data is shareable by a plurality of users. An example thereof will be described below. Cache-Control headers defined by Request for Comments (RFC) 7234 are a criterion for determining whether a cache is shareable by a plurality of users. Values of the Cache-Control headers include "public" and "private". The value "public" indicates a cache that is shareable by a plurality of users, whereas the value "private" indicates a cache that only a specific user can access.

FIG. 1 is a diagram illustrating an example of a hardware configuration of a virtual machine 100 according to a first exemplary embodiment. The virtual machine 100 includes a central processing unit (CPU) 101, a read-only memory (ROM) 102, a random access memory (RAM) 103, an interface 104, and a bus 105.

The CPU 101 controls the virtual machine 100. The ROM 102 stores programs and parameters that do not need changes. The RAM 103 temporarily stores programs and data supplied from external apparatuses. The interface 104 is an interface for displaying stored or supplied data. The bus 105 is a system bus via which the CPU 101, the ROM 102, the RAM 103, and the interface 104 are communicably connected to one another. The virtual machine 100 can be configured by a so-called virtualization technique, and various resources that configure a computer system can be arranged in logical units independently of a physical configuration. Specifically, a plurality of resources can be integrated together to configure the virtual machine 100, or a single resource can be divided to configure one of the divided resources as the virtual machine 100. Specifically, the virtual machine 100 can be configured using at least part of a plurality of resources (that can be configured by a plurality of apparatuses) of an information processing system configuring a cloud system.

The virtual machine 100 can include an interface for an input device such as a keyboard or a pointing device such as a mouse, that inputs data based on a user operation. Further, the virtual machine 100 can include a hard disk or a memory card fixed to the virtual machine 100. Further, the virtual machine 100 can include an external storage apparatus that is removable from the virtual machine 100, such as a flexible disk (FD), an optical disk such as a compact disk (CD), a magnetic card, an optical card, an integrated circuit (IC) card, or a memory card. Further, the virtual machine 100 can include a network interface for connecting to a network line such as the Internet.

Figure 2:
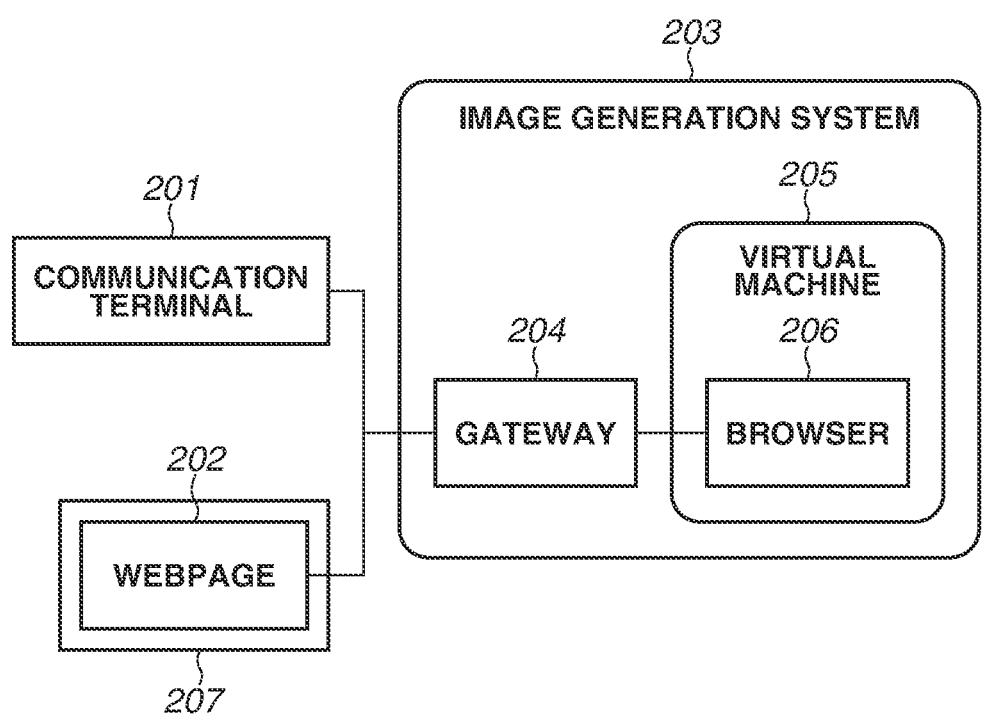
FIG. 2 is a diagram illustrating an example of a configuration of an information processing system.

FIG. 2 is a diagram illustrating an example of a configuration of a conventional information processing system. The information processing system includes a communication terminal 201, an image generation system 203, and a web server 207. The image generation system 203 includes a gateway 204 and a virtual machine 205.

A user is viewing a screen of the communication terminal 201, and a universal resource locator (URL) of a webpage 202 that the user wishes to access is transmitted from the communication terminal 201 to the image generation system 203. The image generation system 203 is a cloud browser. Next, the image generation system 203 accesses the webpage 202 of the web server 207 and generates a drawing result of the webpage 202. Thereafter, the image generation system 203 transmits the generated drawing result of the webpage 202 to the communication terminal 201, and the communication terminal 201 presents the drawing result of the webpage 202 to the user.

The image generation system 203 includes the gateway 204 and the virtual machine 205. A browser 206 operates on the virtual machine 205 and generates the drawing result of the webpage 202. The communication terminal 201 and the virtual machine 205 communicate with each other via the gateway 204, and the web server 207 and the virtual machine 205 communicated with each other via the gateway 204.

Figure 3:
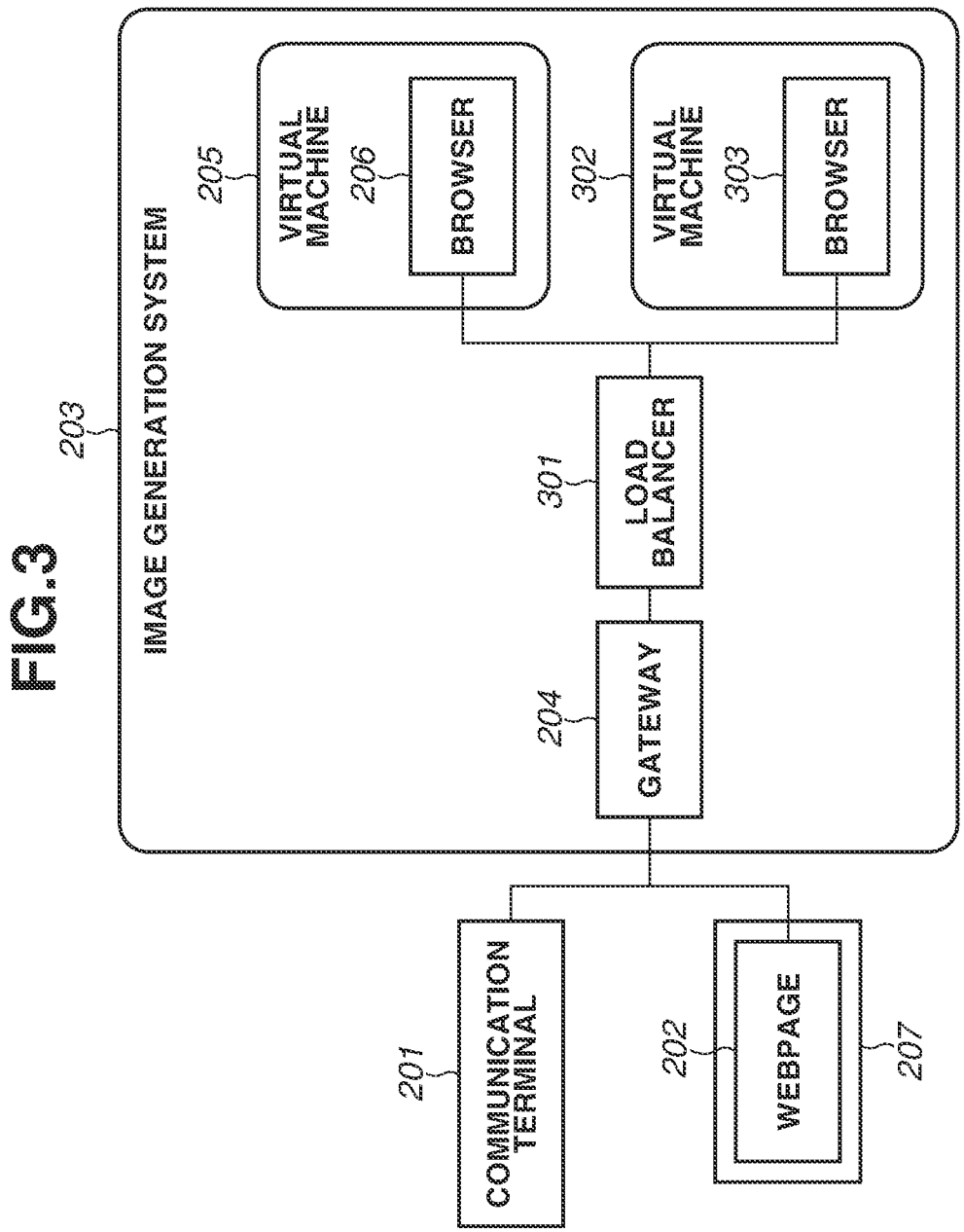
FIG. 3 is a diagram illustrating an example of a configuration of an information processing system.

FIG. 3 is a diagram illustrating an example of a configuration of an information processing system that improves the availability of a cloud browser. The information processing system illustrated in FIG. 3 includes a load balancer 301 and a virtual machine 302 in addition to the configuration of the information processing system illustrated in FIG. 2. The image generation system 203 includes the gateway 204, the virtual machine 205, the load balancer 301, and the virtual machine 302.

The load balancer 301 determines which one of the virtual machines 205 and 302 is to be activated based on the amount and characteristics of communication through the gateway 204. On the virtual machine 302, a browser 303 operates. As apparent from FIG. 3, the browsers 206 and 303 cannot share a local file.

Figure 4:
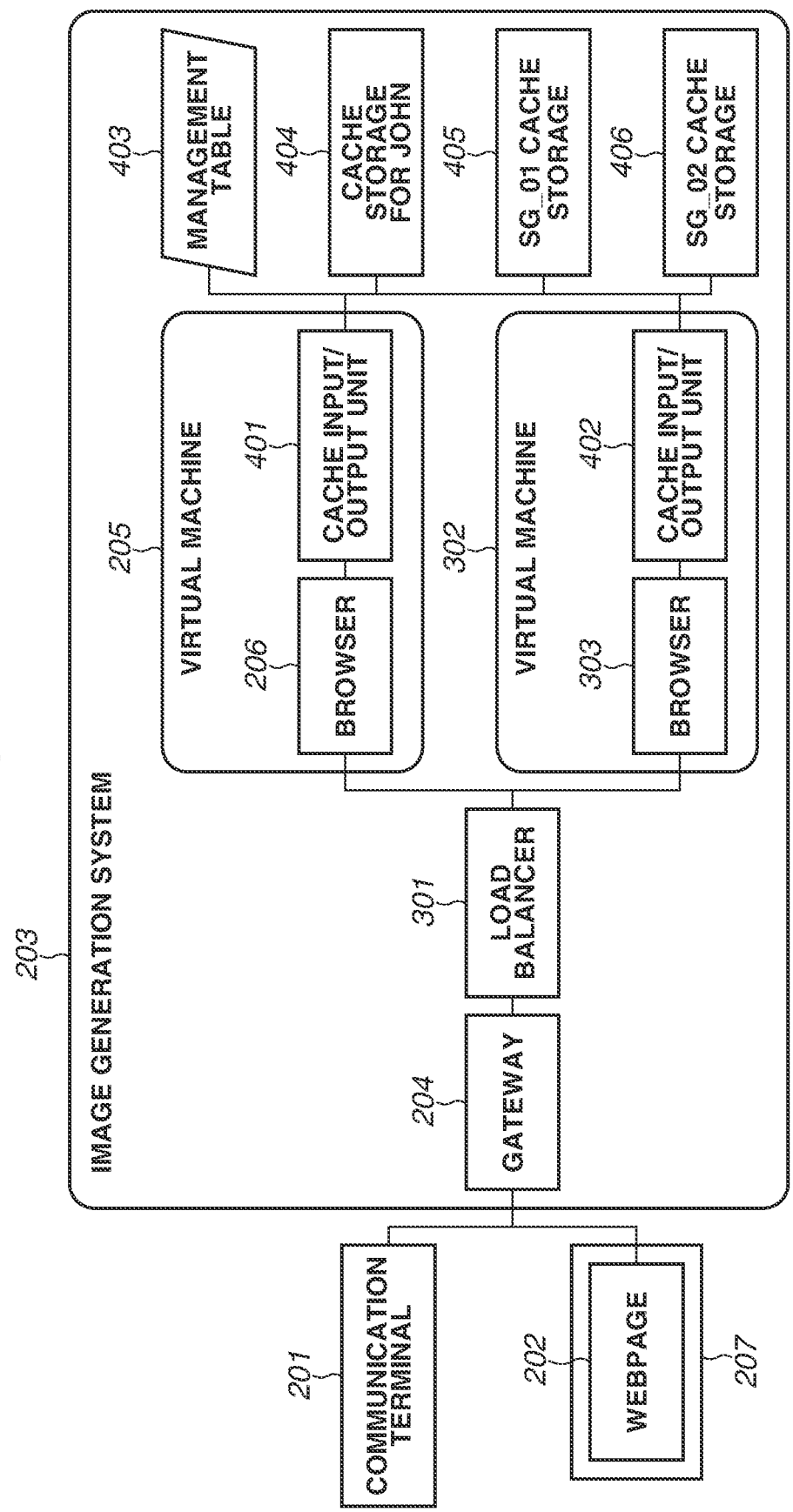
FIG. 4 is a diagram illustrating an example of a configuration of an information processing system.

FIG. 4 is a diagram illustrating an example of a configuration of an information processing system according to the first exemplary embodiment. The information processing system includes the communication terminal 201, the image generation system 203, and the web server 207. The image generation system 203 is a cloud system that provides a cloud browser function. The image generation system 203 includes the gateway 204, the load balancer 301, the virtual machine 205, and the virtual machine 302. The image generation system 203 can include a plurality of gateways 204 and/or a plurality of load balancers 301. Further, the image generation system 203 can include three or more virtual machines. The image generation system 203 further includes a management table 403, a cache storage 404 for John, a SG_01 cache storage 405, and a SG_02 cache storage 406. The cache storage 404 for John is a personal storage and is a cache storage for the user, John. The SG_01 cache storage 405 is a storage for an affiliation group and is a cache storage for the affiliation group SG_01. The SG_02 cache storage 406 is a storage for an affiliation group and is a cache storage for the affiliation group SG_02. The image generation system 203 is an example of an information processing apparatus. The image generation system 203 can be configured by a plurality of apparatuses. The virtual machine 205 includes the browser 206 and a cache input/output unit 401. The virtual machine 302 includes the browser 303 and a cache input/output unit 402. While the information processing system according to the present exemplary embodiment that has a configuration including the communication terminal 201 and the web server 207 is described below, the information processing system can have a configuration consisting of only the image generation system 203.

A specific example of cache storages will be described below with reference to Amazon Web Services® as an example. Amazon Web Services® provides a large number of storages. Amazon Aurora® is a relational database management system for the cloud. Thus, Amazon Aurora® is suitable for use in managing the cache storage 404 for John, the SG_01 cache storage 405, and the SG_02 cache storage 406, which store data sets relating to one another.

Figure 5:
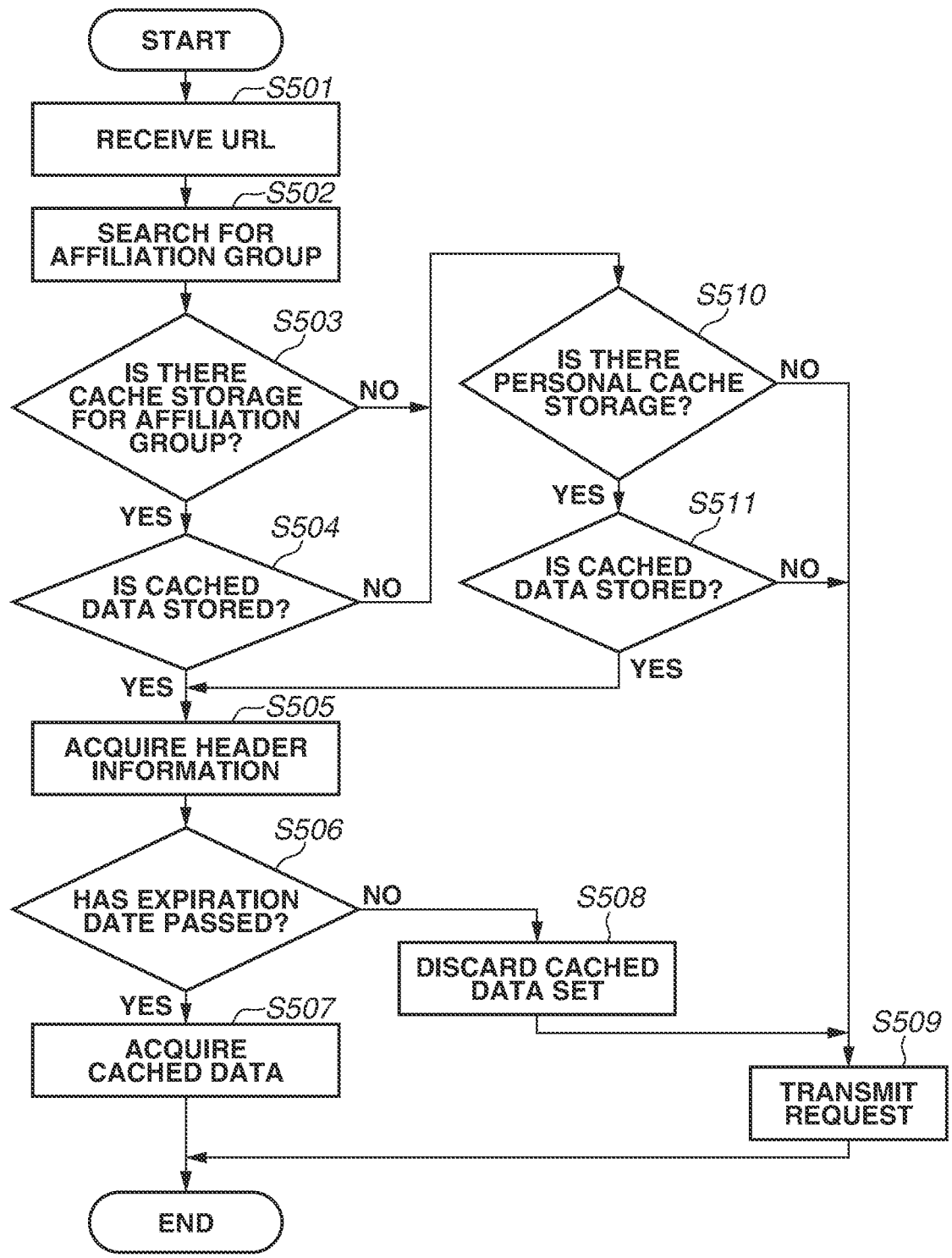
FIG. 5 is a flowchart illustrating a process of requesting a webpage.

FIG. 5 is a flowchart illustrating a process of requesting the webpage 202 according to the present exemplary embodiment. A method of processing information by the image generation system 203 will be described below.

In step S501, the browser 206 of the virtual machine 205 receives the URL of the webpage 202 from the communication terminal 201 via the gateway 204 and the load balancer 301. The URL of the webpage 202 is transmitted through the gateway 204 and the load balancer 301 to the browser 206. Here, assume that the load balancer 301 designates the virtual machine 205.

Here, the user using the cloud browser is John. Further, the URL of the webpage 202 that John wishes to display on the communication terminal 201 is "http://example.com/a.png". Further, the date and time of the use of the cloud browser by John is "Wed, 1 Apr. 2020 10:00:00 GMT".

Next, in step S502, the cache input/output unit 401 of the virtual machine 205 searches for an affiliation group of the user, John, of the communication terminal 201. The management table 403 records a correspondence relationship between users and affiliation groups.

FIG. 6A is a diagram illustrating an example of the management table 403. The management table 403 records a correspondence relationship between usernames and storage names (affiliation groups). UserName is a list of usernames such as John and Terry. Further, Storage Name indicates cache storage names such as SG_01 and SG_02. FIG. 6A indicates that the user John is affiliated to the group with the storage name SG_01. In this case, a cache that the user John uses is stored in the SG_01 cache storage 405.

Next, in step S503, the cache input/output unit 401 determines whether there is a cache storage for the affiliation group acquired in step S502. The cache storage for the affiliation group to which the user John is affiliated is the SG_01 cache storage 405. In a case where the cache input/output unit 401 determines that there is a cache storage for the affiliation group (YES in step S503), the processing proceeds to step S504, whereas in a case where the cache input/output unit 401 determines that there is no cache storage for the affiliation group (NO in step S503), the processing proceeds to step S510.

The image generation system 203 includes the SG_01 cache storage 405 for the affiliation group SG_01 of the user John, but in a case where the user is Joe, since the management table 403 in FIG. 6A does not store an affiliation group of Joe, the processing proceeds to step S510.

In step S504, the cache input/output unit 401 determines whether the cache storage for the affiliation group that is acquired in step S503 stores cached data for the webpage of the received URL.

FIGS. 6B and 6C are diagrams illustrating an example of cached data sets stored in cache storages. FIG. 6B illustrates cached data sets stored in the SG_01 cache storage 405. FIG. 6C illustrates cached data sets stored in the SG_02 cache storage 406. In FIGS. 6B and 6C, URL indicates URLs of cached webpages, and Date/Time indicates dates and times of caching. Further, Header Information indicates header information about a response returned as a response to a previous request, and Cached Data indicates cached data.

Header Information herein can store only cache-related header information or can further store header information about a request. A set of URL, Header Information, and Cached Data is herein referred to as "cached data set". Further, Cached Data stores Hypertext Markup Language (HTML) documents, JavaScript® languages, cascading style sheets (CSS) files, external fonts, and images that configure webpages.

The URL that John wishes to display using the cloud browser is "http://example.com/a.png", and FIG. 6B indicates that there is cached data for the URL.

In a case where the cache input/output unit 401 determines that the cache storage for the affiliation group stores cached data for the webpage of the received URL (YES in step S504), the processing proceeds to step S505. On the other hand, in a case where the cache input/output unit 401 determines that the cache storage for the affiliation group does not store cached data for the webpage of the received URL (NO in step S504), the processing proceeds to step S510.

In step S505, the cache input/output unit 401 acquires an expiration date of the cache in the header information about the URL in the cache storage for the affiliation group. The header information about "http://example.com/a.png" in FIG. 6B indicates that the cache is valid for 24 hours from acquisition.

Next, in step S506, the cache input/output unit 401 determines whether the expiration date acquired in step S505 has passed. The date/time about "http://example.com/a.png" in FIG. 6B is "Wed, 1 Apr. 2020 00:00:00 GMT". Further, the date/time of the use of the cloud browser by John is "Wed, 1 Apr. 2020 10:00:00 GMT". This indicates that John used the cloud browser within 24 hours from the caching. Therefore, it is determined that the cache is within the expiration date.

In a case where the cache input/output unit 401 determines that the expiration date acquired in step S505 has not passed (YES in step S506), the processing proceeds to step S507, whereas in a case where the cache input/output unit 401 determines that the expiration date acquired in step S505 has passed (NO in step S506), the processing proceeds to step S508.

Figure 7:
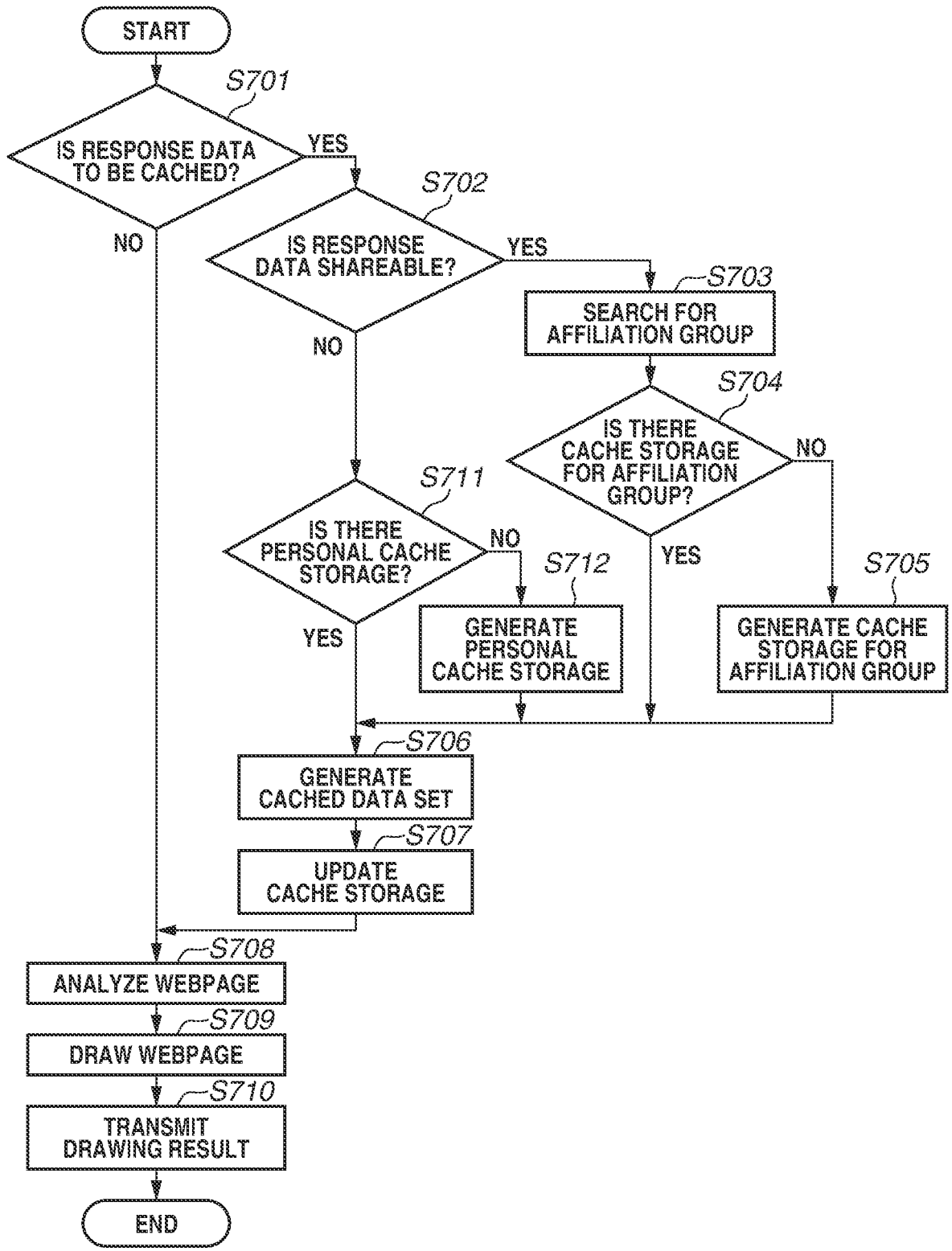
FIG. 7 is a flowchart illustrating a process of receiving webpage data.

In step S507, the cache input/output unit 401 acquires the cached data (Cached Data) from the cache storage for the affiliation group, and the processing proceeds to a flowchart in FIG. 7.

In step S508, the cache input/output unit 401 discards the cached data set from the cache storage for the affiliation group, and the processing proceeds to step S509.

In step S509, the virtual machine 205 transmits a request for the webpage 202 of the received URL to the web server 207 via the gateway 204 and the load balancer 301 based on the received URL. Then, the virtual machine 205 receives the webpage 202 as response data to the request from the web server 207 via the gateway 204 and the load balancer 301, and the processing proceeds to the flowchart in FIG. 7.

In step S510, the cache input/output unit 401 determines whether there is a personal cache storage for the user of the communication terminal 201. The personal cache storage for the user is, for example, the cache storage 404 for John. In a case where the cache input/output unit 401 determines that there is a personal cache storage for the user of the communication terminal 201 (YES in step S510), the processing proceeds to step S511, whereas in a case where the cache input/output unit 401 determines that there is not a personal cache storage for the user of the communication terminal 201 (NO in step S510), the processing proceeds to step S509. The processing of step S509 is as described above.

In step S511, the cache input/output unit 401 determines whether there is cached data for the webpage 202 of the received URL in the personal cache storage for the user. As in step S504, the cache input/output unit 401 refers to the cached data sets and performs determination. In a case where the cache input/output unit 401 determines that there is cached data for the webpage of the received URL in the personal cache storage for the user (YES in step S511), the processing proceeds to step S505. In step S505 and subsequent steps, the cache input/output unit 401 performs processing similar to those described above using the personal cache storage for the user. In a case where the cache input/output unit 401 determines that there is not cached data for the webpage 202 of the received URL in the personal cache storage for the user (NO in step S511), the processing proceeds to step S509. The processing of step S509 is as described above.

FIG. 7 is a flowchart illustrating a process following the process illustrated in the flowchart in FIG. 5. In step S701, in a case where the previous step is step S507, the processing proceeds to step S708. Further, in a case where the previous step is step S509, the cache input/output unit 401 determines whether the response data (the webpage 202) in step S509 is to be cached.

Here, the user using the cloud browser is John. Further, the URL of the webpage that John wishes to display on the communication terminal 201 is "http://example.com/a.png". Further, the date/time of the use of the cloud browser by John is "Wed, 1 Apr. 2020 10:00:00 GMT". Further, the response header is "Cache-Control: public, max-age=86400".

In step S701, the cache input/output unit 401 refers to the value of the Cache-Control header of the response header and the value of the Expires header. For example, in a case where the value of the Cache-Control header is "no-store", the cache input/output unit 401 is not to cache the response data (the webpage 202). Details of the determination of whether to cache are based on the descriptions of RFC 7234.

In a case where the cache input/output unit 401 determines that the response data (the webpage 202) is to be cached (YES in step S701), the processing proceeds to step S702. On the other hand, in a case where the cache input/output unit 401 determines that the response data (the webpage 202) is not to be cached (NO in step S701), the processing proceeds to step S708.

In step S702, the cache input/output unit 401 determines whether the response data (the webpage 202) is shareable with another user. The cache input/output unit 401 determines whether the response data (the webpage 202) is shareable with another user based on whether the Cache-Control header includes the description "public". Since the above-described Cache-Control header includes the description "public", the response data is shareable. In a case the cache input/output unit 401 determines that the response data (the webpage 202) is shareable with another user (YES in step S702), the processing proceeds to step S703, whereas in a case where the cache input/output unit 401 determines that the response data (the webpage 202) is not shareable with another user (NO in step S702), the processing proceeds to step S711.

In step S703, as in step S502, the cache input/output unit 401 searches for an affiliation group of the user of the communication terminal 201, and the processing proceeds to step S704. For example, SG_01 is detected as an affiliation group of the user John.

In step S704, as in step S503, the cache input/output unit 401 determines whether there is a cache storage for the affiliation group acquired in step S703. For example, a cache storage for the affiliation group of the user John is the SG_01 cache storage 405. In a case where the cache input/output unit 401 determines that there is a cache storage for the affiliation group (YES in step S704), the processing proceeds to step S706, whereas in a case where the cache input/output unit 401 determines that there is not a cache storage for the affiliation group (NO in step S704), the processing proceeds to step S705.

In step S705, the cache input/output unit 401 generates a cache storage for the affiliation group acquired in step S703, and the processing proceeds to step S706.

In step S711, the cache input/output unit 401 determines whether there is a personal cache storage for the user of the communication terminal 201. A personal cache storage for the user is, for example, the cache storage 404 for John. In a case where the cache input/output unit 401 determines that there is a personal cache storage for the user of the communication terminal 201 (YES in step S711), the processing proceeds to step S706, whereas in a case where the cache input/output unit 401 determines that there is not a personal cache storage for the user of the communication terminal 201 (NO in step S711), the processing proceeds to step S712.

In step S712, the cache input/output unit 401 generates a personal cache storage for the user of the communication terminal 201, and the processing proceeds to step S706.

In step S706, the cache input/output unit 401 generates a cached data set based on the response data (the webpage 202), and the processing proceeds to step S707.

In step S707, the cache input/output unit 401 updates the cache storage 404 for John or the SG_01 cache storage 405 using the cached data set generated in step S706, and the processing proceeds to step S708. In a case where the response data (the webpage 202) is not shareable with another user, the cache input/output unit 401 stores the cached data set generated in step S706 in the cache storage 404 for John. Further, in a case where the response data (the webpage 202) is shareable with another user, the cache input/output unit 401 stores the cached data set generated in step S706 in the SG_01 cache storage 405.

FIGS. 8A and 8B are diagrams illustrating the processing of steps S706 and S707. FIG. 8A illustrates a state of the SG_01 cache storage 405 before the processing of step S707 is performed. The time when John accesses "http://example.com/a.png" is "Wed, 1 Apr. 2020 10:00:00 GMT". Therefore, the date/time of the cached data set generated in step S706 is "Wed, 1 Apr. 2020 10:00:00 GMT". Thus, as a result of the processing of step S707, the state of the SG_01 cache storage 405 is changed to a state illustrated in FIG. 8B.

In step S708, the browser 206 analyzes the webpage 202 based on the data of the webpage 202, and the processing proceeds to step S709. In step S709, the browser 206 draws the webpage 202 based on a result of the analysis of the webpage 202, and the processing proceeds to step S710. In step S710, the browser 206 transmits the drawing result of the webpage 202 to the communication terminal 201 via the gateway 204 and the load balancer 301. The communication terminal 201 displays the received drawing result of the webpage 202.

While the virtual machine 205 is described above, the virtual machine 302 also performs processing similarly to the virtual machine 205. The virtual machine 302, like the virtual machine 205, can access the management table 403, the cache storage 404 for John, the SG_01 cache storage 405, and the SG_02 cache storage 406.

The image generation system 203 includes the plurality of virtual machines 205 and 302 operated by the browsers 206 and 303, respectively. In step S501, the image generation system 203 functions as a reception unit, and one of the plurality of virtual machines 205 and 302 receives the URL of the webpage 202 from the communication terminal 201.

In a case where there is not cached data for the webpage of the URL received in step S501, the processing proceeds from step S51 to step S509. In step S509, the image generation system 203 functions as a reception unit and receives the webpage 202 from the URL received in step S501. In step S707, the image generation system 203 stores the cached data for the webpage 202 in the SG_01 cache storage 405 or the SG_02 cache storage 406 so that the cached data is available for use by the plurality of virtual machines 205 and 302. In step S709, the browser 206 draws the received webpage 202. In step S710, the browser 206 functions as a transmission unit and transmits the drawing result of the webpage 202 to the communication terminal 201.

In a case where there is cached data for the webpage 202 of the URL received in step S501, the processing proceeds from step S504 or S511 to step S505. In step S709, the browser 206 draws the webpage 202. In step S710, the browser 206 functions as a transmission unit and transmits the drawing result of the webpage 202 to the communication terminal 201.

In step S707, in a case where the received webpage 202 is not shareable with another user, the cache input/output unit 401 stores the cached data for the received webpage 202 in the cache storage 404 for John, the user of the communication terminal 201. On the other hand, in a case where the received webpage 202 is shareable with another user, the cache input/output unit 401 stores the cached data for the received webpage 202 in the SG_01 cache storage 405. In this case, the cache input/output unit 401 functions as a storage unit.

In a case where there is cached data for the webpage 202 of the URL received in step S501 in the cache storage 404 for John, the user of the communication terminal 201, or the SG_01 cache storage 405, the processing proceeds to step S505.

The SG_01 cache storage 405 and the SG_02 cache storage 406 are storages for the respective affiliation groups of the users. In step S707, in a case where the webpage 202 is shareable with another user, the cache input/output unit 401 stores the cached data for the received webpage 202 in the SG_01 cache storage 405 for the affiliation group of the user of the communication terminal 201.

In a case where there is cached data for the webpage 202 of the URL received in step S501 in the cache storage 404 for John or the SG_01 cache storage 405, the processing proceeds to step S505.

Further, in step S707, the image generation system 203 functions as a storage unit and stores the cached data for the webpage that one of the plurality of virtual machines 205 and 302 is requested to draw so that the stored cached data is available for use by the plurality of virtual machines 205 and 302.

In step S501, for example, the virtual machine 205 of the image generation system 203 is requested to draw the webpage 202. In step S504 or S511, in a case where the cached data for the webpage 202 drawn by the virtual machine 302 of the image generation system 203 is stored in step S707, the processing proceeds to step S505. Thereafter, in step S709, the image generation system 203 functions as a drawing unit, and the virtual machine 205 draws the webpage 202 based on the cached data.

In step S504 or S511, in a case where the cached data for the webpage 202 is not stored in step S707, the processing proceeds to step S509. Thereafter, in step S709, the image generation system 203 draws the webpage 202 based on a resource acquired from the web server 207.

In step S710, the image generation system 203 functions as a transmission unit and transmits the drawing result in step S709 to the communication terminal 201 by which the drawing request is issued.

As described above, according to the present exemplary embodiment, the cache storages 404 to 406 are provided so that even in a case where a plurality of users uses the image generation system 203, the plurality of users can share cached data and the network load is decreased.

First Modified Example

According to a first modified example, a domain is used as a determination criterion for changing a cache storage that is a storage destination of a cached data set. An example thereof will be described below. In a case where the URL is "http://example.com/a.png", the domain is "example.com" and the path is "a.png".

FIG. 9 is a diagram illustrating an example of a configuration of an information processing system according to the first modified example. FIG. 9 illustrates the configuration in FIG. 4 without the cache storage 404 for John. Further, in FIG. 9, the SG_01 cache storage 405 and the SG_02 cache storage 406 in FIG. 4 are replaced by an SD_01 cache storage 901 and an SD_02 cache storage 902.

Figure 10:
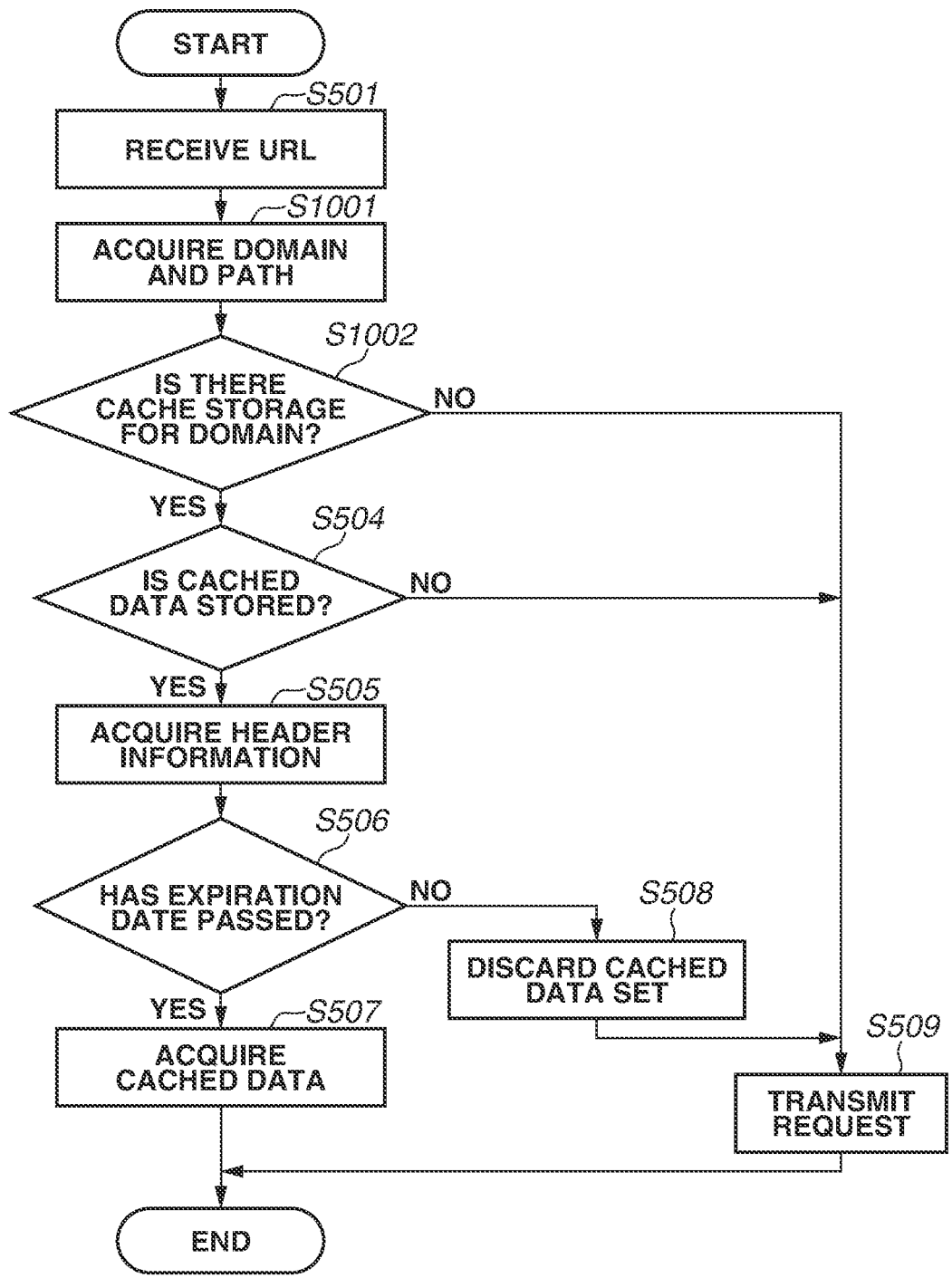
FIG. 10 is a flowchart illustrating a process of requesting a webpage.

FIG. 10 is a flowchart illustrating a process of requesting a webpage according to the first modified example. In step S501, as in FIG. 5, the browser 206 receives the URL of the webpage 202 from the communication terminal 201 via the gateway 204 and the load balancer 301.

Here, the user using the cloud browser is John. Further, the URL of the webpage that John wishes to display on the communication terminal 201 is "http://example.com/a.png". Further, the date/time of the use of the cloud browser by John is "Wed, 1 Apr. 2020 10:00:00 GMT".

Next, in step S1001, the cache input/output unit 401 acquires a domain and a path from the URL received in step S501. In a case where the URL is "http://example.com/a.png", the domain is "example.com" and the path is "a.png".

According to the first exemplary embodiment, the correspondence relationship between the usernames and the cache storages is recorded in the management table 403. According to the first modified example, a correspondence relationship between domains and cache storages is recorded in the management table 403.

FIG. 11A is a diagram illustrating an example of the management table 403 according to the first modified example. In FIG. 11A, Domain indicates domains. Further, Storage Name indicates cache storage names such as SD_01 and SD_02. FIG. 11A indicates that the SD_01 cache storage 901 is assigned to the storage name for the domain "example.com". In this case, the cache of the domain "example.com" is stored in the SD_01 cache storage 901.

Next, in step S1002, the cache input/output unit 401 determines whether there is a cache storage for the domain acquired in step S1001. In a case where the cache input/output unit 401 determines that there is a cache storage for the domain acquired in step S1001 (YES in step S1002), the processing proceeds to step S504, whereas in a case where the cache input/output unit 401 determines that there is not a cache storage for the domain acquired in step S1001 (NO in step S1002), the processing proceeds to step S509.

In step S504, the cache input/output unit 401 determines whether there is cached data for the path acquired in step S1001 in the cache storage for the domain acquired in step S1001. In a case where the cache input/output unit 401 determines that there is cached data for the path acquired in step S1001 in the cache storage for the domain acquired in step S1001 (YES in step S504), the processing proceeds to step S505. Further, in a case where the cache input/output unit 401 determines that there is not cached data for the path acquired in step S1001 in the cache storage for the domain acquired in step S1001 (NO in step S504), the processing proceeds to step S509. Steps S506 to S509 are as in FIG. 5.

FIG. 11B is a diagram illustrating an example of cached data sets stored in the SD_01 cache storage 901. FIG. 11C is a diagram illustrating an example of cached data sets stored in the SD_02 cache storage 902. In FIGS. 11B and 11C, Path indicates paths to the cached data. Attributes of Date/Time, Header Information, and Cached Data are as in FIGS. 6B and 6C.

According to the first modified example, the URL that John wishes to display using the cloud browser is "http://example.com/a.png", and FIG. 11B indicates that there is cached data for the URL.

The SD_01 cache storage 901 and the SD_02 cache storage 902 are storages for respective domains of URLs received in step S501. In step S707, the cache input/output unit 401 stores the cached data for the received webpage 202 in the storage 901 or 902 for the domain of the URL received in step S501. In a case where the cached data for the webpage 202 of the URL received in step S501 is in the storage 901 or 902 for the domain of the URL received in step S501, the processing proceeds to step S505.

As described above, according to the first modified example, the storages 901 and 902 for respective domains of URLs are provided so that even in a case where a plurality of users uses the image generation system 203, the plurality of users can share cached data and the network load is decreased.

According to a second exemplary embodiment, the virtual machines 205 and 302 directly share cached data. An example thereof will be described below. In a case where a local file is shared on a cloud browser on which a large number of virtual machines are arranged, the network load and the data management cost increase. Thus, it is desirable to manage a local file in a cache storage on a server different from a server on which the virtual machines are arranged as in the first exemplary embodiment. On a cloud browser on which only several virtual machines are arranged and are constantly activated, on the other hand, the management cost may be lower in a case where a local file is directly shared.

To perform caching based on RFC 7234, not only cached data but also a URL, acquisition date/time, and header information are needed. Thus, the image generation system 203 generates a cached data set, and the virtual machines share the cached data set.

Figure 12:
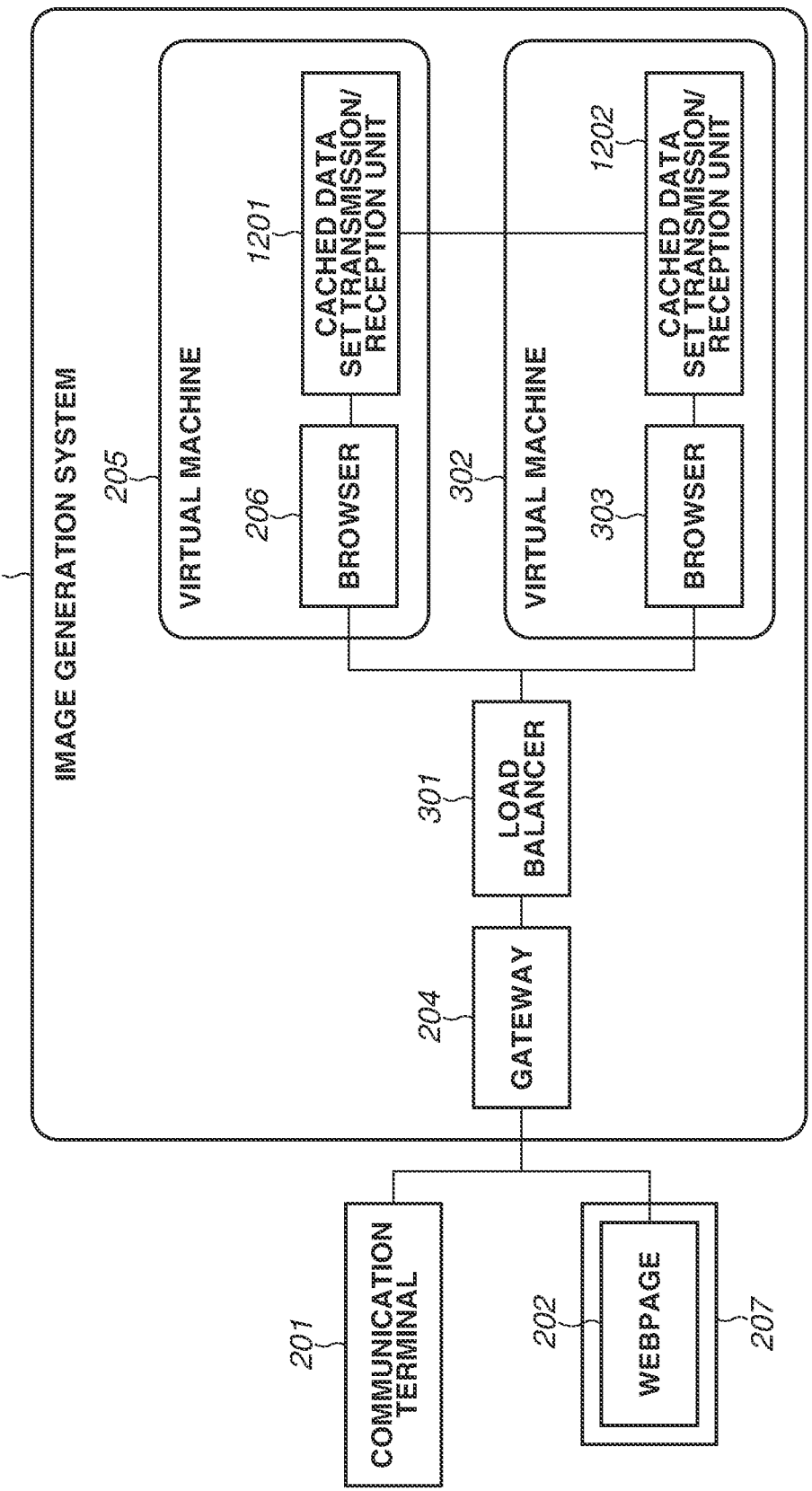
FIG. 12 is a diagram illustrating an example of a configuration of an information processing system.

FIG. 12 is a diagram illustrating an example of a configuration of an information processing system according to the second exemplary embodiment. FIG. 12 further includes a cached data set transmission/reception unit 1201 in the virtual machine 205 and a cached data set transmission/reception unit 1202 in the virtual machine 302 in FIG. 3.

Figure 13:
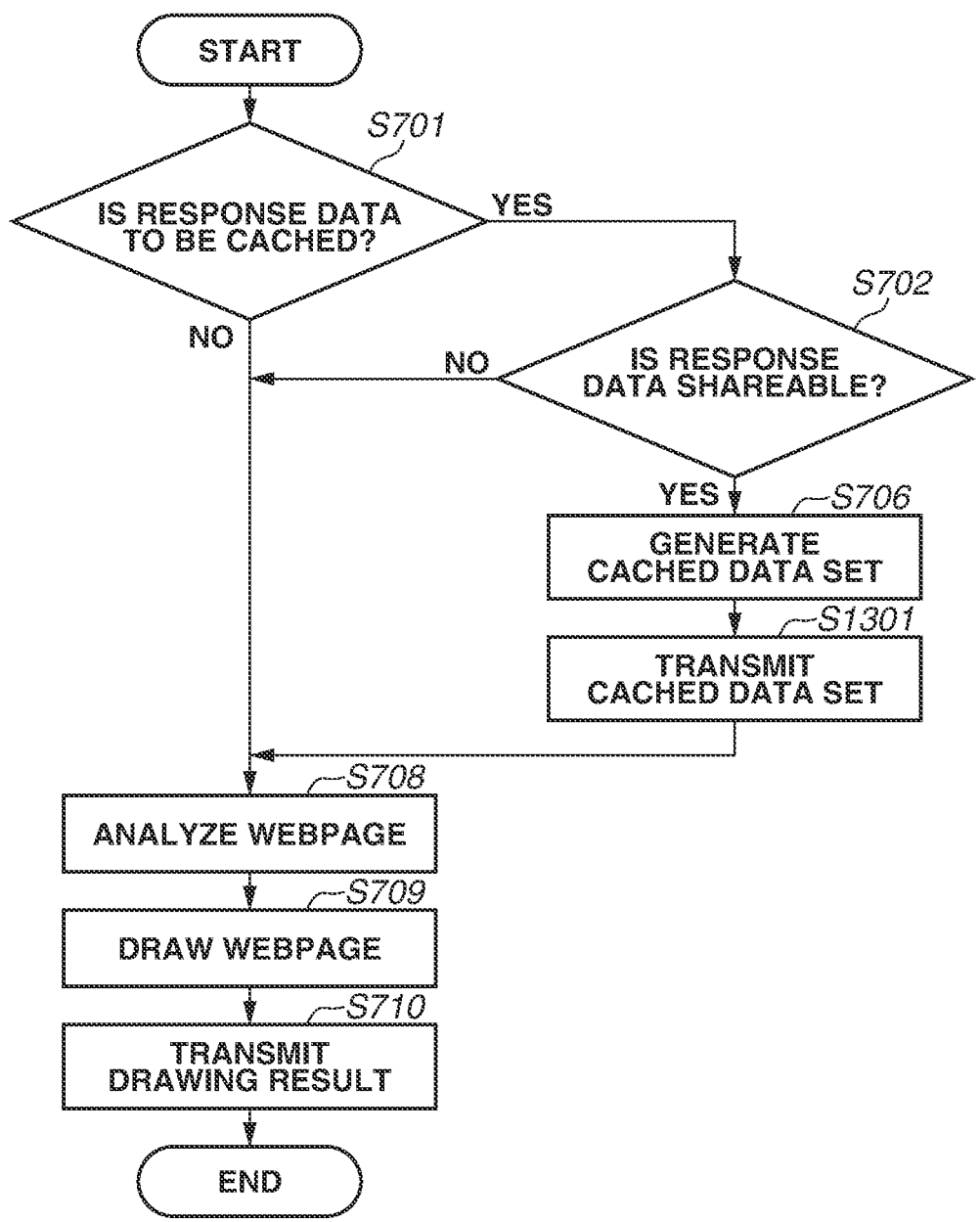
FIG. 13 is a flowchart illustrating a process of receiving webpage data.

FIG. 13 is a flowchart illustrating a process following the flowchart in FIG. 5 according to the second exemplary embodiment. In step S701, as in FIG. 7, in a case where the previous step is step S507, the processing proceeds to step S708. Further, in a case where the previous step is step S509, the cache input/output unit 401 determines whether the response data (the webpage 202) in step S509 is to be cached. In a case where the cache input/output unit 401 determines that the response data (the webpage 202) is to be cached (YES in step S701), the processing proceeds to step S702. On the other hand, in a case where the cache input/output unit 401 determines that the response data (the webpage 202) is not to be cached (NO in step S701), the processing proceeds to step S708.

In step S702, the cache input/output unit 401 determines whether the response data (the webpage 202) is shareable with another user. In a case where the cache input/output unit 401 determines that the response data (the webpage 202) is shareable with another user (YES in step S702), the processing proceeds to step S706, whereas in a case where the cache input/output unit 401 determines that the response data (the webpage 202) is not shareable with another user (NO in step S702), the processing proceeds to step S708.

In step S706, the cached data set transmission/reception unit 1201 generates a cached data set based on the response data (the webpage 202), and the processing proceeds to step S1301.

In step S1301, the cached data set transmission/reception unit 1201 transmits the cached data set to the cached data set transmission/reception unit 1202, and the processing proceeds to step S708. Steps S708 to S710 are similar to those in FIG. 7.

In step S702, the virtual machine 205 determines whether the received webpage is shareable with another user. In a case where the received webpage is not shareable with another user, the virtual machine 205 stores cached data for the received webpage in the virtual machine 205. Further, in a case where the received webpage is shareable with another user, in step S1301, the virtual machine 205 stores cached data for the received webpage in the plurality of virtual machines 205 and 302.

Further, in FIG. 5, in a case where there is cached data for the webpage of the URL received in step S501 in the virtual machine 205, the processing proceeds to step S505.

As described above, according to the second exemplary embodiment, the cached data set transmission/reception units 1201 and 1202 are provided so that even in a case where a plurality of users uses the image generation system 203, the plurality of users can share cached data and the network load is decreased.

According to a third exemplary embodiment, the image generation system 203 stores cached data on a virtual machine while a user uses a cloud browser, and the image generation system 203 moves the cached data to a cache storage immediately before the user stops using the cloud browser.

Here, the user using the cloud browser is John. Further, the URLs of the webpages that John wishes to display on the communication terminal 201 are "http://example.com/a.png" and "http://canon.global/a.png". Further, the date/time of the use of the cloud browser by John is "Wed, 1 Apr. 2020 10:00:00 GMT". In this case, the response header to the request for "http://example.com/a.png" is "Cache-Control: public, max-age=86400". Further, the response header to the request for "http://canon.global/a.png" is "Cache-Control: private" and "Expires: Wed, 10 Jun. 2020 00:00:00 GMT".

According to the third exemplary embodiment, a plurality of virtual machines each stores duplicate cached data, so that the amount of cached data stored in the image generation system is greater than that of the first exemplary embodiment. Meanwhile, according to the third exemplary embodiment, the cached data stored in the virtual machines is used, so that the response speed of the image generation system during the use by the user is higher than that of the first exemplary embodiment.

Figure 14:
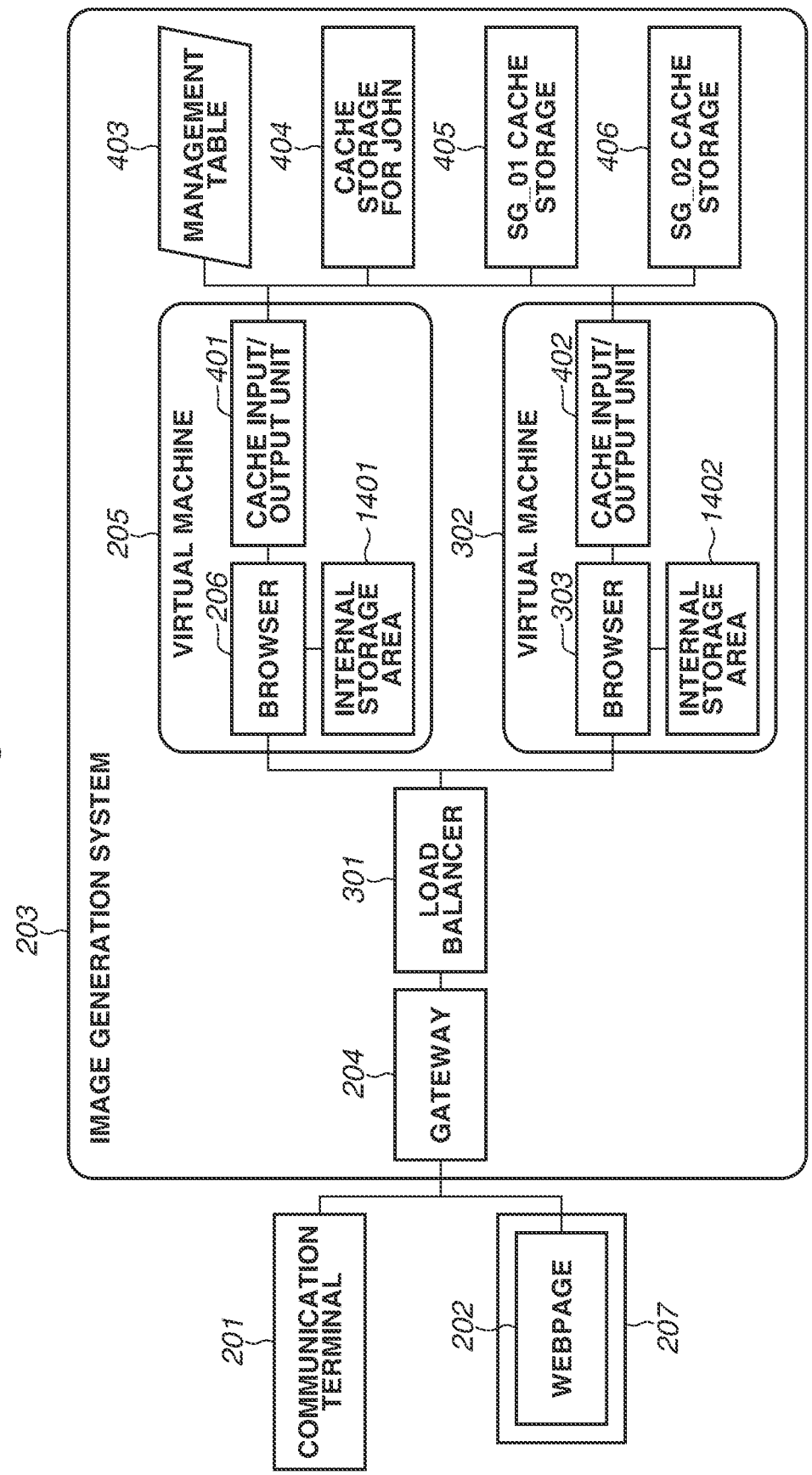
FIG. 14 is a diagram illustrating an example of a configuration of an information processing system.

FIG. 14 is a diagram illustrating an example of a configuration of an information processing system according to the third exemplary embodiment. In FIG. 14, the configuration illustrated in FIG. 4 further includes an internal storage area 1401 in the virtual machine 205 and an internal storage area 1402 in the virtual machine 302.

Figure 15:
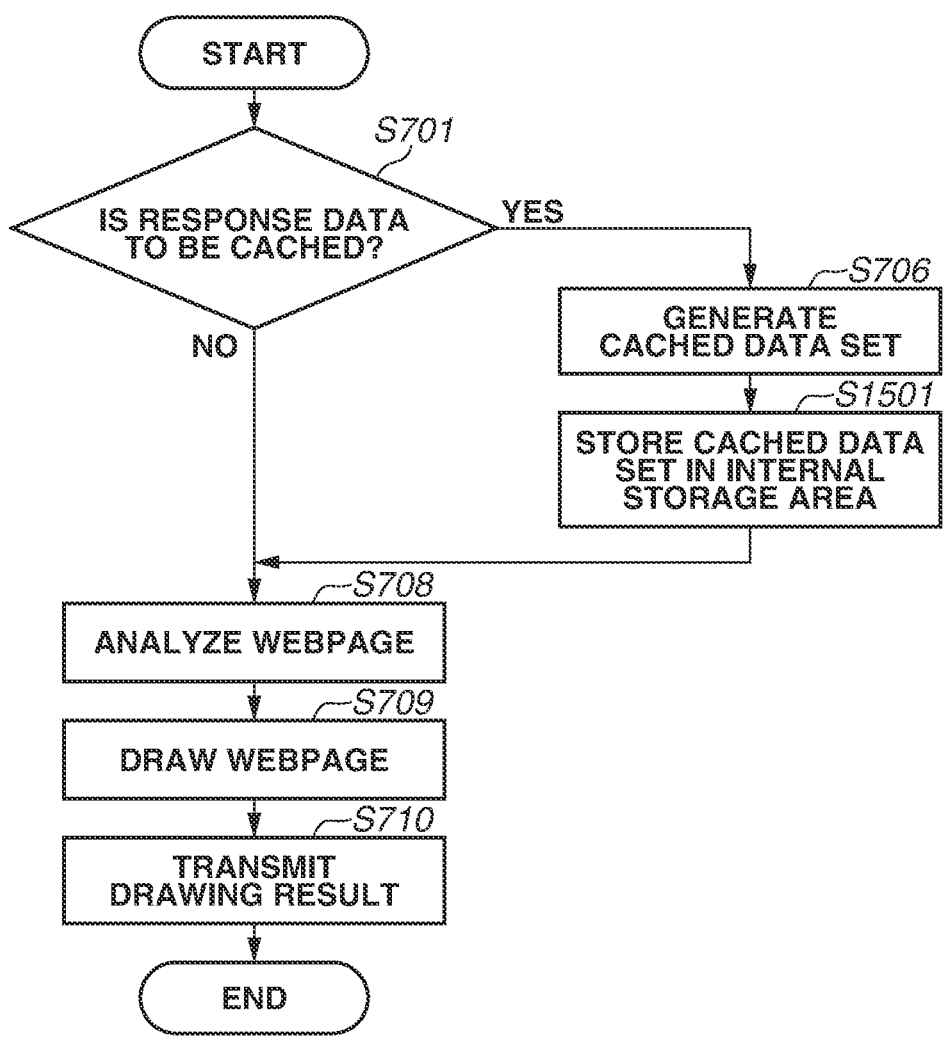
FIG. 15 is a flowchart illustrating a process of receiving webpage data.

FIG. 15 is a flowchart illustrating a process following the flowchart in FIG. 5 according to the third exemplary embodiment. In step S701, as in FIG. 7, in a case where the previous step is step S507, the processing proceeds to step S708. Further, in a case where the previous step is step S509, the cache input/output unit 401 determines whether the response data (the webpage 202) in step S509 is to be cached. In a case where the cache input/output unit 401 determines that the response data (the webpage 202) is to be cached (YES in step S701), the processing proceeds to step S706. On the other hand, in a case where the cache input/output unit 401 determines that the response data (the webpage 202) is not to be cached (NO in step S701), the processing proceeds to step S708.

In step S706, the cache input/output unit 401 generates a cached data set based on the response data (the webpage 202), and the processing proceeds to step S1501. In step S1501, the browser 206 stores the cached data set in the internal storage area 1401, and the processing proceeds to step S708. Steps S708 to S710 are as in FIG. 7.

FIG. 17A is a diagram illustrating an example of cached data sets stored in the internal storage area 1401. In FIG. 17A, the item "public" is added to FIG. 6B. The item "public" is used to determine whether the cached data set is disclosable. In a case where the cached data set is disclosable, the value "1" is stored in the item "public", whereas in a case where the cached data set is not disclosable, the value "0" is stored in the item "public". For example, the response header to the request for "http://example.coma.png" contains "Cache-Control: public", so that the value "1" is stored in the item "public". According to the present exemplary embodiment, the cached data sets are recorded in a virtual machine, so that the virtual machine does not determine the shareability with another user, not as in step S702 in FIGS. 7 and 13.

Figure 16:
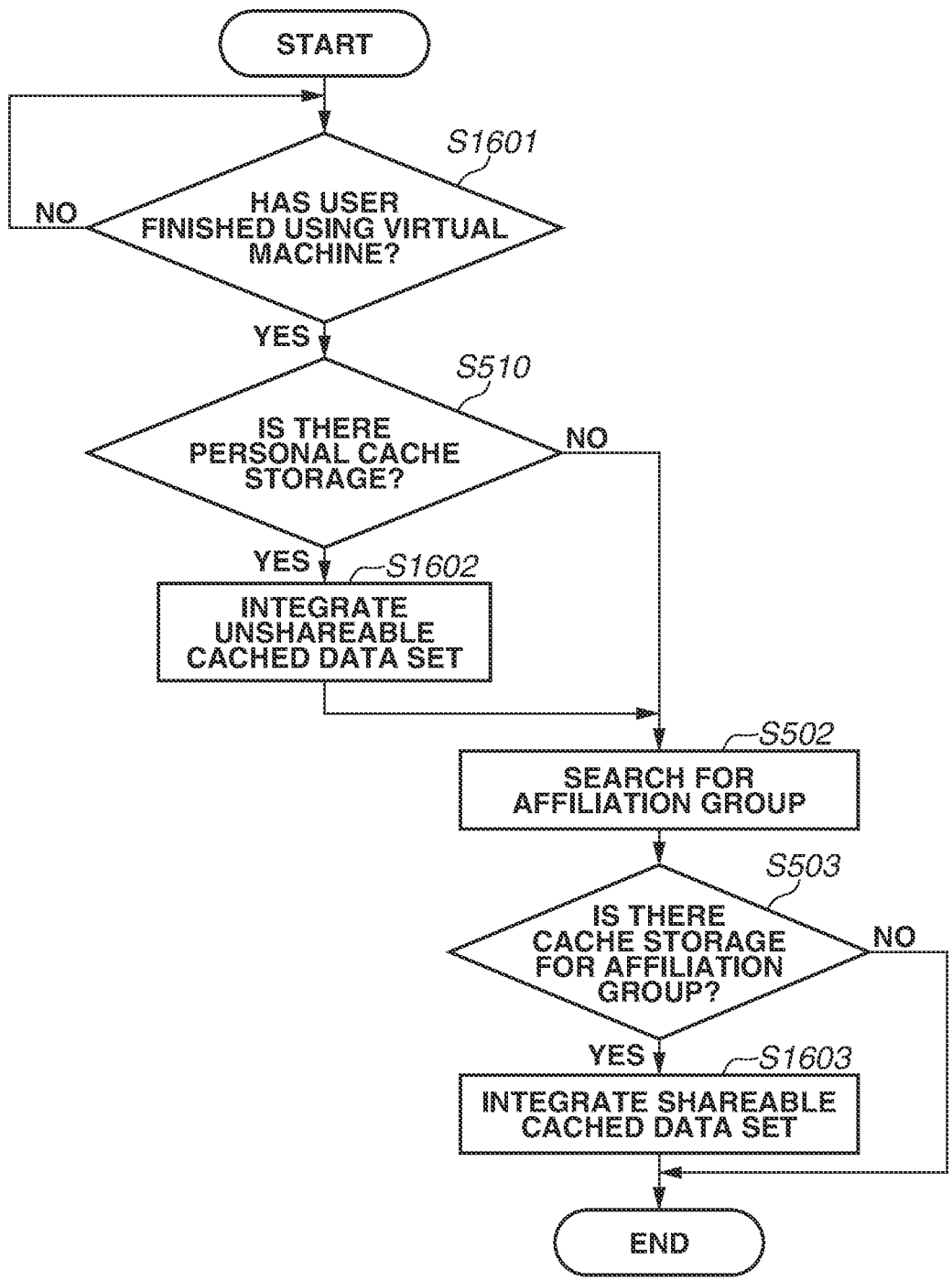
FIG. 16 is a flowchart illustrating a process of integrating cached data.

FIG. 16 is a flowchart illustrating a process of integrating cached data according to the third exemplary embodiment. The integrating of cached data refers to the processing of storing cached data sets stored in an internal storage area of a virtual machine in a cache storage.

In step S1601, the image generation system 203 determines whether the user of the communication terminal 201 has finished using the virtual machine 205 or 302. In a case where the image generation system 203 determines that the user of the communication terminal 201 has not finished using the virtual machine 205 or 302 (NO in step S1601), the image generation system 203 waits until the user of the communication terminal 201 finishes using the virtual machine 205 or 302. On the other hand, in a case where the image generation system 203 determines that the user of the communication terminal 201 has finished using the virtual machine 205 or 302 (YES in step S1601), the processing proceeds to step S510.

In step S510, the cache input/output unit 401 determines whether there is a personal cache storage for the user of the communication terminal 201. A personal cache storage for the user is, for example, the cache storage 404 for John. In a case where the cache input/output unit 401 determines that there is a personal cache storage for the user of the communication terminal 201 (YES in step S510), the processing proceeds to step S1602, whereas in a case where the cache input/output unit 401 determines that there is not a personal cache storage for the user of the communication terminal 201 (NO in step S510), the processing proceeds to step S502.

In step S1602, the cache input/output unit 401 integrates the cached data set in the internal storage area 1401 in FIG. 17A that is not shareable with a user other than John into the cache storage 404 for John, and the processing proceeds to step S502.

FIG. 17B is a diagram illustrating a state of the cache storage 404 for John before the integrating. FIG. 17C is a diagram illustrating a state of the cache storage 404 for John after the integrating.

The cached data set in the internal storage area 1401 in FIG. 17A that is not shareable with a user other than John in step S1602 is the cached data set with the "public" value of 0 in FIG. 17A. The cached data set with the "public" value of 0 in FIG. 17A is the cached data set for "http://canon.global/a.png". In a case where the cache storage 404 for John stores the cached data set for "http://canon.global/a.png", the cached data set in the cache storage 404 for John is overwritten with the cached data set with the newest date/time.

When FIGS. 17A and 17B are compared in terms of the cached data set for "http://canon.global/a.png", the cached data set for "http://canon.global/a.png" is not in FIG. 17B. Thus, the cached data set for "http://canon.global/a.png" in FIG. 17A is added to FIG. 17B. At this time, the item "public" in FIG. 17A is unnecessary in FIG. 17B and is therefore not integrated. As a result, the state of the cache storage 404 for John after the integrating is as illustrated in FIG. 17C.

In step S502, the cache input/output unit 401 searches for an affiliation group of John, the user of the communication terminal 201, and the processing proceeds to step S503. In step S503, the cache input/output unit 401 determines whether there is a cache storage for the affiliation group detected in step S502. A cache storage for the affiliation group of John is the SG_01 cache storage 405. In a case where the cache input/output unit 401 determines that there is a cache storage for the affiliation group (YES in step S503), the processing proceeds to step S1603, whereas in a case where the cache input/output unit 401 determines that there is not a cache storage for the affiliation group (NO in step S503), the process illustrated in the flowchart in FIG. 16 ends.

In step S1603, the cache input/output unit 401 integrates the cached data set in the internal storage area 1401 in FIG. 17A that is shareable with a user other than John into the cache storage for the affiliation group.

FIG. 18A is a diagram illustrating an example of cached data sets stored in the internal storage area 1401 and is the same as FIG. 17A. FIG. 18B is a diagram illustrating a state of the SG_01 cache storage 405 before the integrating. FIG. 18C is a diagram illustrating a state of the SG_01 cache storage 405 after the integrating.

The cached data set in the internal storage area 1401 in FIG. 17A that is shareable with a user other than John in step S1603 is the cached data set with the "public" value of 1 in FIG. 18A. The cached data set with the "public" value of 1 in FIG. 18A is the cached data set for "http://example.com/ a.png". In a case where the SG_01 cache storage 405 stores the cached data set for "http://example.com/a.png", the cached data set in the SG_01 cache storage 405 is overwritten with the cached data set with the newer date/time.

When the cached data set for "http://example.com/a.png" in FIG. 18A and the cached data set for "http://example.com/ a.png" in FIG. 18B are compared, the date/time of the cached data set in FIG. 18A is newer than the other. Thus, the cached data set for "http://example.com/a.png" in FIG. 18B is overwritten with the cached data set for "http:// example.com/a.png" in FIG. 18A. In this case, the item "public" in FIG. 18A is unnecessary in FIG. 18B and is therefore not integrated. As a result, the state of the SG_01 cache storage 405 after the integrating is as illustrated in FIG. 18C.

As described above, the cache input/output unit 401 stores the cached data for the received webpage that is stored in the internal storage area 1401 in the cache storages 404 to 406 after the use of the virtual machine 205 is finished.

As described above, according to the third exemplary embodiment, the cached data is stored in the cache storages 404 to 406 after the use of the virtual machine 205 is finished so that the load during the use of the virtual machine 205 is decreased.

Other Exemplary Embodiments

The present disclosure is also realized by the following processing. Specifically, a program for realizing one or more functions of the above-described exemplary embodiments is supplied to a system or an apparatus via a network or a storage medium, and one or more processors of a computer of the system or the apparatus read the program and execute the read program. Further, the present disclosure is also realized by a circuit (e.g., application-specific integrated circuit (ASIC)) that realizes one or more functions.

It should be noted that the above-described exemplary embodiments each illustrate a mere specific example of implementation of the present disclosure and the technical scope of the present disclosure is not to be interpreted narrowly based on the exemplary embodiments. In other words, the present disclosure can be implemented in various forms without departing from the technical concept or major features of the present disclosure.

With the present disclosure, even in a case where a plurality of users uses a cloud browser, the plurality of users can share cached data and the network load is decreased.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-187884, filed Nov. 11, 2020, which is hereby incorporated by reference herein in its entirety.

What is claimed is:

1. An information processing apparatus connecting with a plurality of web machines, the information processing apparatus comprising:
   one or more computer-readable storage media; and
   one or more processors that are in communication with the one or more computer-readable storage media,
   wherein the one or more processors and the one or more computer-readable storage media are configured to control the information processing apparatus to implement:
   a storage unit configured to store cached data for web content that one of the plurality of web machines is requested to draw so that the cached data is available for use by the plurality of web machines;
   a first transmission unit configured to transmit, in a case where a first web machine of the plurality of web machines is requested to draw first web content and cached data for the first web content is stored in the storage unit, a drawing result based on the cached data to a communication apparatus by which the request to draw is issued; and
   a second transmission unit configured to draw the first web content based on a resource acquired from a web server and transmit a drawing result to the communication apparatus in a case where the first web machine is requested to draw the first web content and the cached data for the first web content is not stored in the storage unit, and
   wherein in a case where the web content is not allowed to be shared with another user, the storage unit stores the cached data for the web content in a first storage, and in a case where the web content is allowed to be shared with another user, the storage unit stores the cached data for the web content in a second storage.

2. The information processing apparatus according to claim 1, wherein the one or more processors and the one or more computer-readable storage media are further configured to control the information processing apparatus to implement:
   a first reception unit configured to receive a universal resource locator (URL) of the web content from the communication apparatus; and
   a second reception unit configured to receive the web content from the URL received by the first reception unit in a case where there is no cached data for the web content of the URL received by the first reception unit by the web machine by which the URL is received,
   wherein the storage unit stores cached data for the web content received by the second reception unit in a storage that is available for use by the plurality of web machines.

3. The information processing apparatus according to claim 2,
   wherein in a case where the web content received by the second reception unit is not allowed to be shared with another user, the storage unit stores the cached data for the web content received by the second reception unit in the first storage for a user of the communication apparatus, whereas in a case where the web content received by the second reception unit is allowed to be shared with another user, the storage unit stores the cached data for the web content received by the second reception unit in the second storage, and
   wherein in a case where the cached data for the web content of the URL received by the first reception unit is in the first storage for the user of the communication apparatus or in the second storage, the first transmission unit draws the web content and transmits a drawing result of the web content to the communication apparatus.

4. The information processing apparatus according to claim 3, wherein the second storage is a second storage for each affiliation group of the user, wherein in a case where the web content received by the second reception unit is allowed to be shared with another user, the storage unit stores the cached data for the web content received by the second reception unit in the second storage for the affiliation group of the user of the communication apparatus, and wherein in a case where the cached data for the web content of the URL received by the first reception unit is in the first storage for the user of the communication apparatus or in the second storage for the affiliation group of the user of the communication apparatus, the first transmission unit draws the web content and transmits a drawing result of the web content to the communication apparatus.

5. The information processing apparatus according to claim 4, wherein the storage is a storage for each domain of the URL received by the first reception unit, wherein the storage unit stores the cached data for the web content received by the second reception unit in the storage for the domain of the URL received by the first reception unit, and wherein in a case where the cached data for the web content of the URL received by the first reception unit is in the storage for the domain of the URL received by the first reception unit, the web content is drawn, and a drawing result of the web content is transmitted to the communication apparatus.

6. The information processing apparatus according to claim 3, wherein the storage unit stores the cached data for the web content received by the second reception unit in the plurality of web machines, and wherein in a case where the cached data for the web content of the URL received by the first reception unit is in the web machine by which the URL is received, the first transmission unit draws the web content and transmits a drawing result of the web content to the communication apparatus.

7. The information processing apparatus according to claim 3, wherein in a case where the web content received by the second reception unit is not allowed to be shared with another user, the storage unit stores the cached data for the web content received by the second reception unit in the web machine by which the URL is received, whereas in a case where the web content received by the second reception unit is allowed to be shared with another user, the storage unit stores the cached data for the web content received by the second reception unit in the plurality of web machines, and wherein in a case where the cached data for the web content of the URL received by the first reception unit is in the web machine by which the URL is received, the first transmission unit draws the web content and transmits a drawing result of the web content to the communication apparatus.

8. The information processing apparatus according to claim 2, wherein the storage unit stores the cached data for the web content received by the second reception unit in the storage after use of the web machine by which the URL is received is finished.

9. A method of processing information by an information processing apparatus connecting with a plurality of web machines, the method comprising:

storing cached data for web content that one of the plurality of web machines is requested to draw so that the cached data is available for use by the plurality of web machines;

transmitting, in a case where a first web machine of the plurality of web machines is requested to draw first web content and cached data for the first web content is stored in a storage unit, a drawing result based on the cached data to a communication apparatus by which the request to draw is issued; and drawing the first web content based on a resource acquired from a web server and transmitting a drawing result to the communication apparatus in a case where the first web machine is requested to draw the first web content and the cached data for the first web content is not stored in the storage unit, and wherein in a case where the web content is not allowed to be shared with another user, the cached data for the web content is stored in a first storage, and in a case where the web content is allowed to be shared with another user, the cached data for the web content is stored in a second storage.

10. A non-transitory computer-readable storage medium storing a program for causing a computer to execute a method, the method comprising:

storing cached data for web content that one of a plurality of web machines is requested to draw so that the cached data is available for use by the plurality of web machines;

transmitting, in a case where a first web machine of the plurality of web machines is requested to draw first web content and cached data for the first web content is stored in a storage unit, a drawing result based on the cached data to a communication apparatus by which the request to draw is issued; and drawing the first web content based on a resource acquired from a web server and transmitting a drawing result to the communication apparatus in a case where the first web machine is requested to draw the first web content and the cached data for the first web content is not stored in the storage unit, and wherein in a case where the web content is not allowed to be shared with another user, the cached data for the web content is stored in a first storage, and in a case where the web content is allowed to be shared with another user, the cached data for the web content is stored in a second storage.

* * * * *